UNITED STATES PATENT OFFICE.

AUGUSTE PAUL GALLEY, OF PARIS, FRANCE, ASSIGNOR TO SOCIETE FRANCAISE DU CERAMOID, OF PARIS, FRANCE, A CORPORATION OF FRANCE.

PLASTIC MATERIAL.

1,321,429. Specification of Letters Patent. Patented Nov. 11, 1919.

No Drawing. Application filed January 29, 1918. Serial No. 214,400.

*To all whom it may concern:*

Be it known that I, AUGUSTE PAUL GALLEY, of 1 rue Nicolai, Paris, France, manufacturer, have invented a new and useful Improvement in Plastic Material, which improvement is fully set forth in the following specification.

This invention has for its object new plastic materials which are of general application, but which are more especially useful for molding the heads and bodies of dolls.

A compact and very tenacious material consisting of a mixture of zinc chlorid and zinc oxid is produced as is well known when hydrochloric acid acts upon zinc oxid:

$$2HCl + ZnO = ZnCl_2 + H_2O$$
$$ZnCl_2 + ZnO = Zn_2OCl_2$$

If a concentrated solution of zinc chlorid in place of hydrochloric acid is caused to act directly upon zinc oxid the so-called Meyer cement is produced, but this cannot be utilized either experimentally or commercially because of the great and rapid evolution of heat which occurs when the bodies are mixed together.

Moreover, even if Meyer cement could be molded the article produced would be as brittle as glass or porcelain.

According to this invention the reaction which produces zinc oxychlorid is retarded by causing it to take place within a colloidal mass so that the plastic material can be molded before it sets too hard. The solution also of zinc chlorid is replaced by a solution of an alkaline earth chlorid, preferably calcium chlorid, in which case the reaction is no longer violent, but very slow: a mixed salt of zinc and calcium, viz., the oxychlorid of zinc and calcium ($Zn_2OCl_2$, $Ca_2OCl_2$) is produced by double decomposition.

Preferably the invention is carried out as follows:

The necessary quantity of zinc oxid is added little by little and with continual stirring to a colloidal substance (gelatin, for example) which has been liquefied by hydration and heat; a concentrated solution (about 32° Baumé) of calcium chlorid is now added, care being taken that the temperature of the mixture does not rise above 60° C. If a more flexible material is required a small quantity of sulfur may be added.

Suitable proportions are as follows:

| | Parts. |
|---|---|
| Anhydrous calcium chlorid | 10 |
| Commercial zinc oxid | 200 |
| Glycerin | 100 |
| Washed sulfur | 25 |
| Gelatin or other similar material | 2000 |
| Water | 1955 |
| | 4290 |

These proportions may be varied to some extent and some of the materials may be replaced by their equivalents.

Claims—

1. A plastic composition adapted for making dolls and the like comprising gelatin and zinc oxid and calcium chlorid incorporated therewith to constitute a slowly setting plastic mass adapted to be molded.

2. A plastic composition adapted for making dolls and the like comprising gelatin and zinc oxid and an alkaline earth metal chlorid incorporated therewith to constitute a slowly setting plastic mass adapted to be molded.

3. A plastic composition comprising a plastic colloidal substance and zinc oxid, sulfur and calcium chlorid incorporated therewith to constitute a slowly setting plastic mass adapted to be molded.

4. The process of preparing a plastic composition adapted to be molded and afterward to slowly set and harden, consisting in mixing a plastic colloidal substance with zinc oxid and then incorporating in said mass calcium chlorid while preventing the temperature of the mixture from rising above 60° centigrade.

In testimony whereof, I have signed this specification in the presence of two subscribing witnesses.

AUGUSTE PAUL GALLEY.

Witnesses:
GASTON DE MESTRAL,
CHAS. P. PRESSLY.